United States Patent Office 3,492,700
Patented Feb. 3, 1970

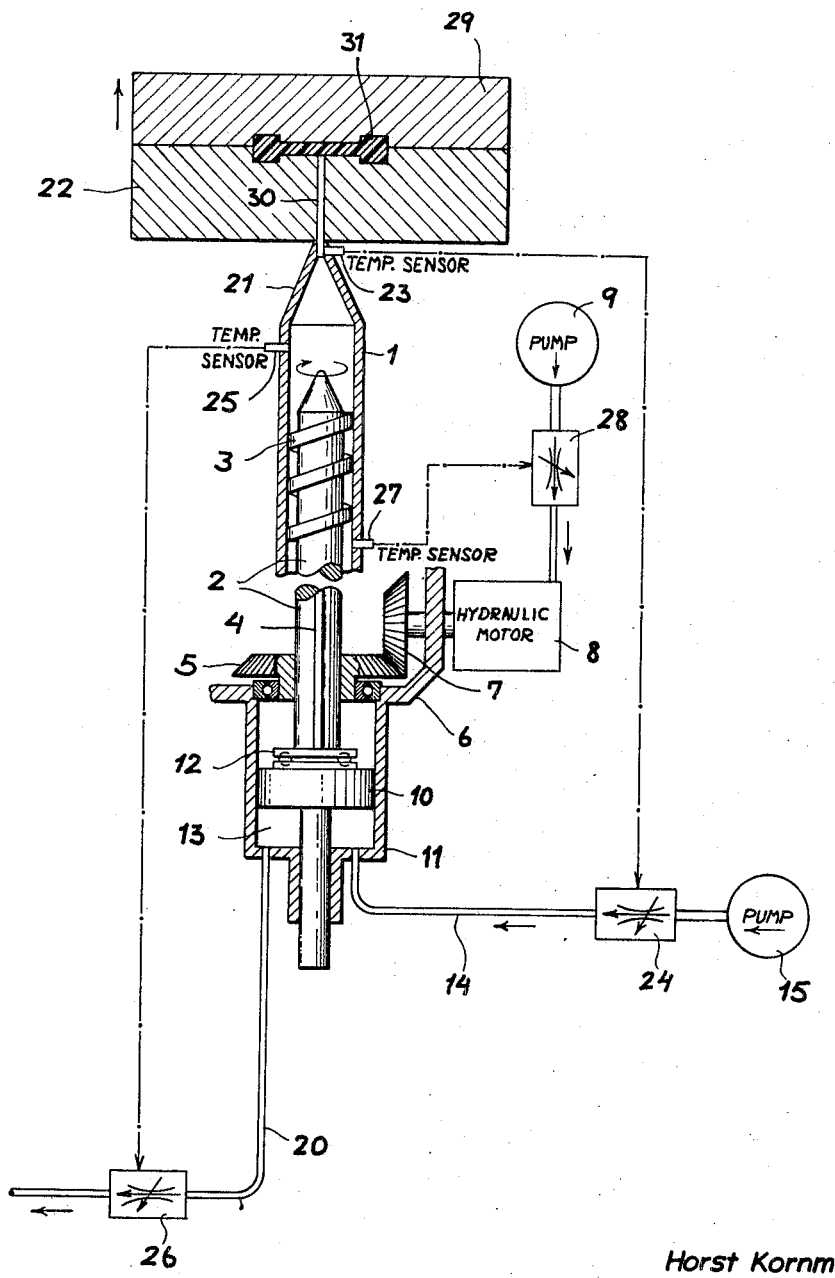

3,492,700
INJECTION-MOLDING MACHINE
Horst Kornmayer, Gottmadingen, Germany, assignor, by mesne assignments, to Fahr-Bucher Gesellschaft mbH., Constance, Germany
Filed Oct. 5, 1967, Ser. No. 673,154
Claims priority, application Germany, Nov. 30, 1966, M 71,852
Int. Cl. B29f 1/00
U.S. Cl. 18—30                                 10 Claims

ABSTRACT OF THE DISCLOSURE

In an injection-molding machine of the type wherein an injectable mass is plastified in a precompression chamber, prior to injection, by a rotating and axially receding feed screw, temperature sensors are provided at the outlet of the precompression chamber, at a forward part of that chamber close to the outlet and at a rear part of the chamber remote from the outlet to control, respectively, the forward speed of the feed screw during the injection stroke, the reaction pressure of the receding feed screw and its rate of rotation during plastification so as to keep the temperature of the injected mass substantially uniform and constant.

My present invention relates to an injection-molding machine of the type wherein an injectable mass, e.g. of thermoplastic resin, is plastified in a precompression chamber before being discharged under pressure into a mold cavity through an orifice connecting that cavity with the precompression chamber, the latter containing a rotatable feed screw which precompresses the mass in a closed state of the orifice, receding axially against a reaction force as the pressure builds up, and which thereafter is moved forward to serve as an injection piston while the orifice is unblocked.

The injectable mass, usually admitted into the compression chamber in a fluid or semifluid state, heats up and becomes less viscous while being subjected to the plastifying action of the feed screw. The temperature of this mass at the time of injection thus depends on several factors, including particularly the injection rate, the friction generated by the rotating screw during the preceding plastification step, and the degree of compression of the mass in the chamber just before the orifice opens. The two last-mentioned parameters are a function of, respectively, the rotary speed of the feed screw and the reaction force which resists the rearward axial displacement of the rotating screw.

For the mass production of standard-quality molded products it is important to insure the existence of a substantially invariable injection temperature, also particularly in the case of larger articles to be molded, uniformity of temperature throughout the mass is highly desirable to avoid the development of thermal stresses during the molding process.

It is, therefore, the principal object of my present invention to provide means for substantially maintaining a constant temperature at the injection orifice during the discharge of a plastified fluid mass from a compression chamber into a mold cavity.

Another important object is to provide means for substantially equalizing the temperature of the injectable mass throughout the precompression chamber.

In accordance with my present invention I provide one or more temperature sensors at the injection orifice to control the rate of discharge of the plastic mass through that orifice under pressure from the advancing feed screw, this control being achieved by varying the rate of advance inversely with the temperature detected at the orifice. Advantageously, I provide for this purpose a valve inserted in a line between a fluid cylinder and a source of operating fluid, such as a pump serving for the displacement of a piston coupled with the feed screw, the valve responding to the output of the temperature sensor or sensors by progressively throttling the fluid flow upon a rise in the measured temperature beyond a predetermined limit.

In accordance with another feature of my invention, a second and third temperature sensor (or group of sensors) are respectively disposed at a forward location of the precompression chamber, relatively close to the orifice, and at a rear location thereof relatively remote from the orifice, to control the reaction force of the receding screw and the rate of its rotation, respectively, in inverse relations to the measured temperatures. Again, advantageously, the temperature-responsive means may have the form of valves inserted in an outlet of a fluid cylinder surrounding a piston coupled with the feed screw and in a supply line for a fluid-driven motor serving for the rotation of the feed screw.

The invention will be described in greater detail with reference to the accompanying drawing, the sole figure of which shows, in a partly sectional view, the principal elements of an injection-molding machine incorporating my present improvement.

The machine shown in the drawing comprises a pair of mold halves 22, 29 which together define a cavity 31 and which can be separated in the usual manner, not further illustrated, to give access to an article molded in the cavity. An orifice 30 connects the cavity 31 with the interior of a screw cylinder 1, representing a precompression chamber, and may be alternately blocked and unblocked by conventional means in the open and the closed state, respectively of the mold 22, 29.

A screw spindle 2 with threads 3 confronts a discharge port 21 of cylinder 1, communicating with orifice 30, and is provided with a key 4 which fits in a keyway (not shown) of a bevel gear 5 meshing with a further bevel gear 7 on the shaft of a hydraulic motor 8, the motor shaft is journaled in the machine housing 6 which also carries the cylinder 1 together with the fixed mold portion 22. A further cylinder 11, rigid with housing 6, concerns a piston 10 which is coupled to the screw spindle 2 through the intermediary of a thrust bearing 12 allowing free rotation of the spindle. A pump 9 supplies hydraulic fluid to motor 8 by way of a throttle valve 28. Another pump 15 is operable in step with the mold cycle to admit pressure fluid, such as oil, to the working space 13 of the cylinder 11 by way of a throttle valve 24; cylinder 11 has an outlet pipe 20 for the discharge of the fluid through a further throttle valve 26, the rate of this discharge determining the reaction force with which the piston 10 opposes any rearward displacement of feed screw 2.

In accordance with the present invention, I provide a first temperature sensor 23 at the discharge port 21 of cylinder 1 in the immediate vicinity of injection orifice 30, to control the rate of fluid flow from pump 15 into cylinder 11; a second temperature sensor 25 is disposed at a forward portion of cylinder 1, to control the rate of fluid outflow by way of valve 26, and a third temperature sensor 27 rearwardly of sensor 25 controls the throttle valve 28 to adjust the operating speed of motor 8. It will be understood that each sensor 23, 25, 27 is representative of any convenient number of such temperature feelers arranged at the location indicated.

In operation, fresh plastic mass is admitted into cylinder 1 from a hopper (not shown) while the feed screw 2 is in its forward position, orifice 30 being blocked and movable mold portion 29 being separated from mold portion 22 to release a previously molded article from cavity 31. Thereafter, as the mold closes, feed screw 2 is rotated by motor 8 at a rate depending on the setting of throttle valve 28 as determined by the temperature of the plastic mass in the vicinity of sensor 27, this temperature being influenced by the friction generated between the mass and the screw and depending therefore on the rotary speed of the latter. As the screw 2 turns, at a rate decreasing with increasing output of sensor 27, its engagement with the compressed mass in cylinder 1 drives it axially backward against the force of the fluid trapped within the space 13, the counterpressure exerted by that fluid depending on the flow resistance of throttle valve 26 and being thus determined by the output of temperature sensor 25; valve 26 opens as the temperature detected by sensor 25 rises. Finally, after the feed screw 2 has completely receded, orifice 30 is unblocked and pump 15 is actuated to admit fresh fluid into the space 13, thereby driving the feed screw 2 forward and discharging the plastified mass through the unblocked orifice 30 into the cavity 31 of the closed mold; the speed of the advancing screw is determined by the output of temperature sensor 23 which controls the setting of throttle valve 24.

It will thus be seen that I have devised a system for controlling the principal temperature-influencing factors in response to temperature changes at the very locations where these factors contribute most to the generation of heat within the precompression chamber of cylinder 1, i.e., at the orifice 30 by the friction of injection, in the forward part of cylinder 1 as a result of screw pressure and in the rear part of the cylinder because of friction of rotation.

Naturally, the arrangement described and illustrated may be modified in various details without departing from the spirit and scope of my invention as defined in the appended claims.

I claim:

1. In an injection-molding machine having an injection orifice, a precompression chamber terminating at said orifice, and a feed screw rotatable and axially displaceable in said chamber for plastifying an injectable mass and subsequently discharging said mass through said orifice into a mold cavity, the combination therewith of temperature-sensing means at said orifice and feed means responsive to said temperature-sensing means for advancing said feed screw at a rate varying inversely with the temperature of said mass at said orifice.

2. The combination defined in claim 1 wherein said feed means comprises a drive piston coupled with said feed screw, a source of operating fluid for said drive piston and valve means between said source and said drive piston controlled by said temperature-sensing means.

3. The combination defined in claim 1, further comprising second temperature-sensing means at a forward location of said chamber adjacent said orifice, and counterpressure means responsive to said second temperature-sensing means for exerting upon said feed screw a reaction force varying inversely with the temperature of said mass at said forward location.

4. The combination defined in claim 3 wherein said counterpressure means comprises a fluid cylinder provided with an outlet, a piston in said cylinder coupled with said feed screw and valve means in said outlet controlled by said second temperature-sensing means 5. The combination defined in claim 3, further comprising third temperature-sensing means at a rear location of said chamber remote from said orifice, and drive means responsive to said third temperature-sensing means for rotating said feed screw at a speed varying inversely with the temperature of said mass at said rear location.

6. The combination defined in claim 5 wherein said drive means comprises a fluid motor coupled with said feed screw, a source of operating fluid for said motor and valve means between said source and said motor controlled by said third temperature-sensing means, said counterpressure means comprising a fluid cylinder provided with an outlet, a piston in said cylinder coupled with said feed screw and valve means in said outlet controlled by said second temperature-sensing means.

7. The combination defined in claim 1, further comprising additional temperature-sensing means at a location of said chamber remote from said orifice, and drive means responsive to said additional temperature-sensing means for rotating said feed screw at a speed varying inversely with the temperature of said mass at said location.

8. The combination defined in claim 7 wherein said drive means comprises a fluid motor coupled with said feed screw, a source of operating fluid for said motor and valve means between said source and said motor controlled by said additional temperature-sensing means.

9. The combination defined in claim 1 wherein said feed means comprises piston means coupled with said feed screw, cylinder means surrounding said piston means, a source of operating fluid for said piston means connected with said cylinder means, and first valve means between said source and said cylinder means controlled by said temperature-sensing means, said cylinder means being provided with an outlet, further comprising second temperature-sensing means at a forward location of said chamber adjacent said orifice and second valve means in said outlet controlled by said second temperature-sensing means for exerting upon said feed screw a reaction pressure varying inversely with the temperature of said mass at said forward location 10. The combination defined in claim 9, further comprising third temperature-sensing means at a rear location of said chamber remote from said orifice, a fluid motor coupled with said feed screw for rotating same, a supply of operating fluid for said motor and third valve means between said supply and said motor controlled by said third temperature-sensing means for driving said feed screw at a speed varying inversely with the temperature of said mass at said rear location.

References Cited

UNITED STATES PATENTS

| | | | |
|---|---|---|---|
| 3,032,822 | 5/1962 | Maddock | 18—2 |
| 3,146,287 | 8/1964 | Kleine-Albers | 18—30 X |
| 3,148,231 | 9/1964 | Spencer | 264—40 |
| 3,354,501 | 11/1967 | Bachman et al. | 264—40 X |
| 3,357,049 | 12/1967 | Spindler | 18—30 X |

WILBUR L. McBAY, Primary Examiner

U.S. Cl. X.R.

18—2; 264—40